(12) United States Patent
Ezer et al.

(10) Patent No.: US 6,275,239 B1
(45) Date of Patent: Aug. 14, 2001

(54) MEDIA COPROCESSOR WITH GRAPHICS VIDEO AND AUDIO TASKS PARTITIONED BY TIME DIVISION MULTIPLEXING

(75) Inventors: Gulbin Ezer, San Jose; Sudhaker Rao, Mountain View; Timothy J. van Hook, Atherton; Ronald Nicholson, Santa Clara, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/137,017

(22) Filed: Aug. 20, 1998

(51) Int. Cl.[7] .................................................. G06F 15/00
(52) U.S. Cl. ............................................................ 345/473
(58) Field of Search ..................................... 345/473, 474, 345/418, 475, 118, 121

(56) References Cited

U.S. PATENT DOCUMENTS 6,043,818 * 3/2000 Nakano et al. ....................... 345/473

* cited by examiner

*Primary Examiner*—Phu Nguyen
(74) *Attorney, Agent, or Firm*—Wagner, Murabito & Hao LLP

(57) ABSTRACT

A media coprocessor for performing 3-D graphics, video, and audio functions. The media coprocessor is comprised of a single IC semiconductor chip which is coupled with a host processor chip, one or more memory chips, and an I/O controller chip. The media coprocessor includes a digital bitstream processor, a digital signal processor, and a display processor. An update interval, synchronized to a video frame, is defined. This update interval is divided into a number of partitions. Audio data is processed during one of the partitions. Video data is processed during another partition. And 3-D graphics is processed in another partition. Thereby, the processing is performed in a sequential, time-division multiplex scheme whereby the single media coprocessor chip processes all three partitions in a single video frame.

19 Claims, 10 Drawing Sheets

MEDIA COPROCESSOR WITH GRAPHICS VIDEO AND AUDIO TASKS PARTITIONED BY TIME DIVISION MULTIPLEXING

FIELD OF THE INVETION

The present invention relates to an integrated media coprocessor chip which partitions graphics, video, and audio tasks through time division multiplexing.

BACKGROUND OF THE INVENTION

Computing devices take many different shapes, sizes, and costs. These computing devices range from portable hand-held organizers, computers, set-top units, gaming consoles to electronic "appliances." At the heart of each computer device lies a microprocessor which acts as the brain of the device. Successive generations of microprocessor designs have resulted in faster speeds and enhanced processing power. However, the overall price charged for any given computing device has historically tended to remain the same. In general, one would expect to pay roughly the same amount of money for the purchase of a new PC or gaming console today as a few years ago, except that today's devices would be much faster and have improved performance and functionalities (e.g., superior three-dimensional graphics and/or video capabilities which runs at faster speeds).

Some consumers will pay a premium to get the latest and greatest models to hit the shelves. However, there is a huge segment of the consumer market which cannot afford or justify the expense of buying the latest and greatest. Yet, this market segment would enjoy playing computer games, surfing the Internet, sending e-mail, performing word-processing, video teleconferencing, etc. In an effort to reduce the price of such a computing device, some manufacturers are selling stripped down, bare-bones systems. But even these basic, no frills devices are too expensive. Less expensive alternatives are oftentimes too specialized and focused on only one particular computing application. Increasing their performance and functionalities results in increased costs as well.

One reason why it becomes more costly to offer enhanced functionality and performance is due to the fact that added functionalities are typically achieved by inserting additional, new integrated circuit (IC) chips and/or cards to the system. For example, specialized graphics chipsets are often added to enhance graphics generation; video cards are inserted to improve video display; and custom audio circuits might be designed for specialized sound effects. In so doing, expenses are incurred to fabricate the new chips/boards, wire them together, control the various circuits, and otherwise provide the proper interface and timing between the assortment of components. Furthermore, the media processing was typically performed independently by each of the functional units. For instance, the graphics chipsets would render graphics images; the video chipset would perform its video processing; and the audio circuitry would generate the appropriate audio signals. Each of these three tasks was performed concurrently by each of the separate, dedicated functional units.

In contrast, the present invention provides a much less expensive computing system without sacrificing much in the way of functionality, quality, and versatility. The present invention achieves this by designing a single, integrated media co-processor chip which is capable of processing graphics, video and audio. This reduces costs because it minimizes duplicate functionalities and redundant circuitry. With the media co-processor chip, the present invention partitions different media tasks so that they are performed sequentially in a time-division multiplexed format. For a given amount of time synchronized to the video frame, a specified amount of time is partitioned to perform audio tasks; a specified amount of time is partitioned to process video; and the time left over is partitioned to render graphics.

SUMMARY OF THE INVENTION

The present invention relates to an integrated media coprocessor chip which partitions 3-D graphics, video, and audio tasks through time division multiplexing. The media coprocessor is comprised of a single IC semiconductor chip which is coupled with a host processor chip, one or more memory chips, and an I/O controller chip. In the currently preferred embodiment, the media coprocessor is comprised of a digital bitstream processor, a digital signal processor, and a display processor. An update interval, synchronized to a video frame, is defined. This update interval is divided into a number of partitions. Audio data is processed during one of the partitions. Video data is processed during another partition. And 3-D graphics is processed in yet a third partition. These partitions are then processed sequentially in a time-division multiplex scheme by the media coprocessor chip. Because the media coprocessor chip performs each of these tasks in a partitioned, time-division multiplexed scheme, certain circuits can be used to perform the same functions with respect to audio, video, and/or 3-D graphics applications. Thereby, expenses are minimized with minimal impact to performance.

BRIEF DESCRIPTION OF THE DRAWINGS

The operation of this invention can be best visualized by reference to the drawings.

DETAILED DESCRIPTION

A media coprocessor chip which partitions 3-D graphics, video, and audio tasks through time division multiplexing is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
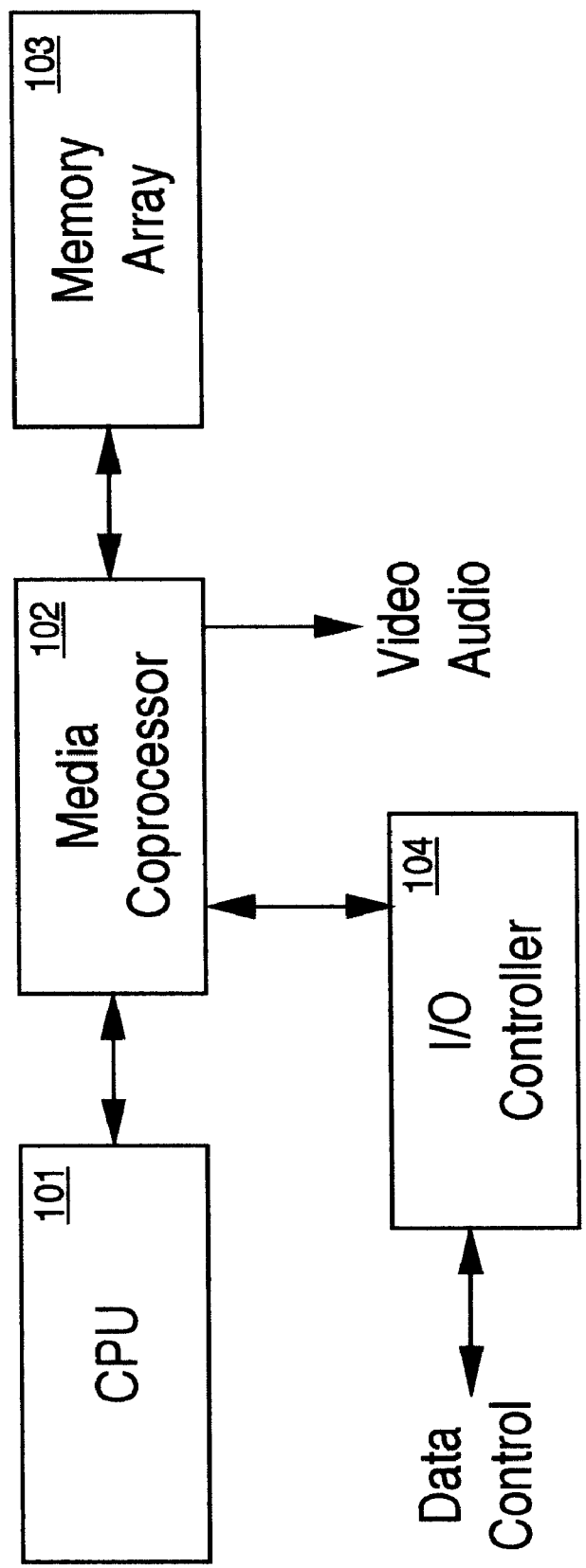
FIG. 1 shows a block diagram of a processing system using an integrated media coprocessor and a unified memory according to the present invention.

FIG. 1 shows a block diagram of a processing system using an integrated media coprocessor and a unified memory upon which the present invention may be practiced. The media coprocessor is comprised of a single IC semiconductor chip which is coupled with a host processor chip, one or more memory chips, and an I/O controller chip. More particularly, a standard central processing unit (CPU) 101 is coupled to media coprocessor 102. CPU 101 is a commercially available microprocessor (e.g., Intel or MIPS) which provides a portable high-performance applications platform with a complete high-level language development environment. The media coprocessor 102 is a low cost application specific integrated circuit (ASIC) chip which supports real-time 3-D graphics, video, and audio. It forms the core of a variety of consumer products, such as interactive digital television set-top boxes and edutainment products. The media coprocessor 102 provides an application performance spectrum including: 3D textured, shaded, z-buffered, antialiased, blended polygons; 2D scaled, rotated, and translated transparent sprite image; full-screen frame-rate MPEG2 (i.e., ISO/IEC 13818-x) video and audio decompression; full-screen frame-rate video display including scaling, filtering, keying, and compositing; and audio wavetable synthesis and signal processing. Media coprocessor 102 outputs video and audio signals for display of 3-D graphics/video and playback of sound/speech. The video output supports NTSC and PAL resolutions with a full-color display, while the audio output supports stereo sound.

A memory array 103 is coupled to media coprocessor 102 for temporary storage of data and instructions. Memory array 103 is comprised of commercially available dynamic random access memories (DRAMs). All applications code and data, as well as display and I/O buffers, share the memory array 103, thereby allowing the greatest applications flexibility at the lowest memory cost. An input/output (I/O) controller 104 is also coupled to media coprocessor 102. I/O controller 104 is an intelligent direct memory access (DMA) engine which transfers data between memory buffers and I/O interfaces, including video and audio input and a variety of peripheral interfaces for control and data (e.g., network interfaces and mass storage devices). In addition, due to cost constraints, the memory 103 is a single array of DRAMs used for all the product memory requirements, such as system and application memory, display buffer, intermediary motion picture experts group (MPEG) frames, and I/O buffering. Video display from this array with all the other usages require a very high speed interface, such as a synchronous or Rambus DRAMs. The following example shows memory usage for a 4 MB configuration: frame buffer (720×480 by 16 bit)=0.7 MB; depth buffer (720×480 by 16 bit)=0.7 MB; MPEG intermediary frames (3 by 720×480 by 16 bit)=2.1 MB; MPEG digital bitstream buffers=0.3 MB; media libraries and real-time microkemel=0.2 MB; and application code and data=0.7 MB. Typically, the Z buffer and a second frame buffer fro 3-D graphics would not be in use concurrently with the three MPEG frames. Note that a PAL display format would increase the size of each frame by approximately 15%.

Figure 2:
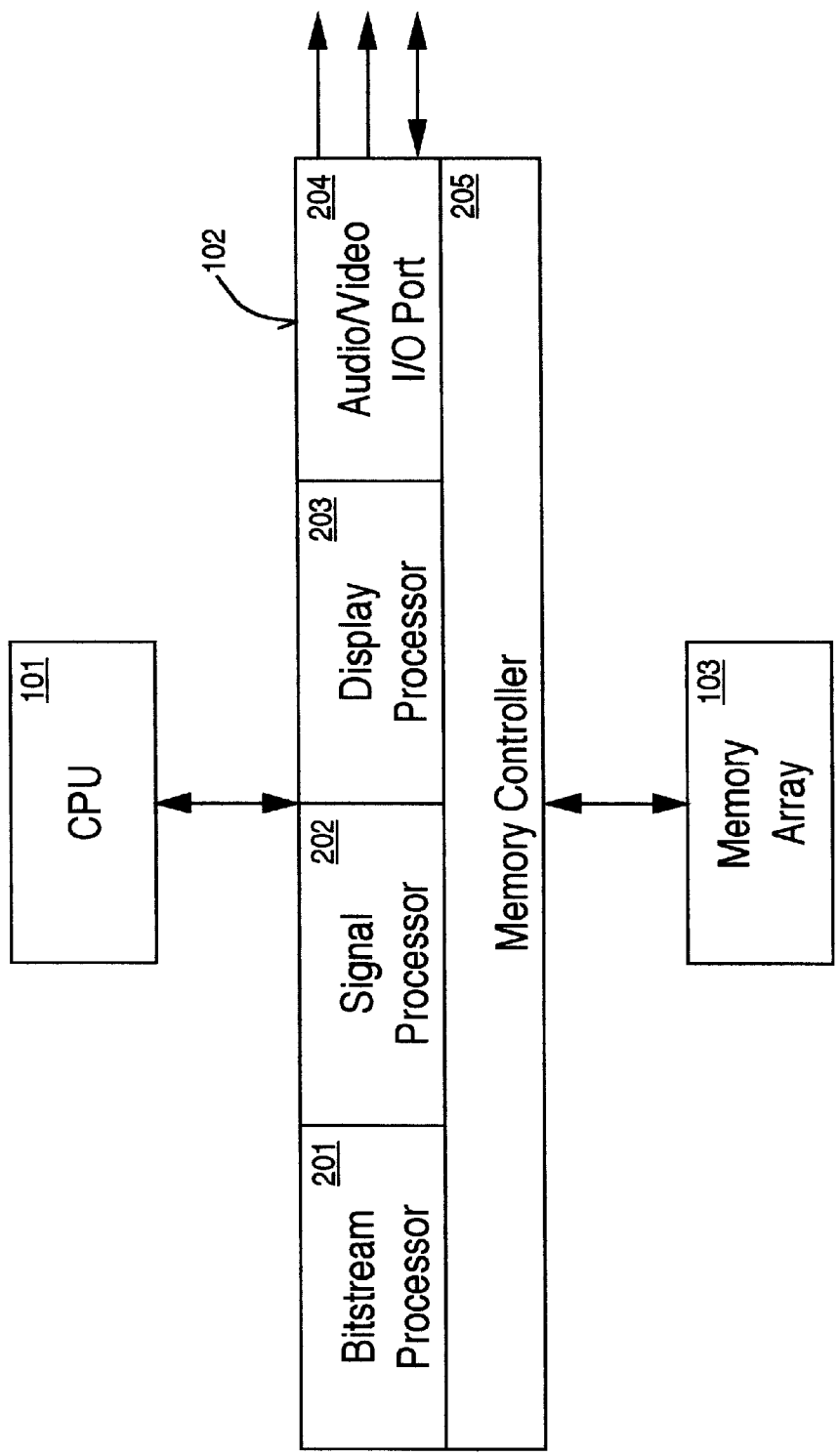
FIG. 2 is a block diagram of the media coprocessor.

FIG. 2 is a block diagram of the media coprocessor 102. The media coprocessor 102 is comprised of several functional units: the digital bitstream processor 201, digital signal processor 202, display processor 203, audio/video I/O port 204, and memory controller 205. Memory controller 205 optimizes DRAM block transfers for the CPU 101, audio, video and I/O ports 204, and the three processor units 201–203. The digital bitstream processor 201 performs decoding of variable length code (VLC) digital bitstream data. The digital signal processor 202 is a microcoded single instruction multiple data (SIMD) processor with parallel integer multiplier-accumulators. The digital signal processor 202 performs video and audio decompression and filtering and geometry processing in conjunction with the CPU 101 for 2D and 3D graphics. The display processor 203 is a data-driven display pipeline supporting both geometric 3-D graphics and image data types. For 3D graphics, the display processor 203 renders fully textured, shaded, antialiased, z-buffered, alpha-blended polygons. For video and 2D graphics, the display processor 203 scales, rotates, translates, filters, and composites images or sprites with per-pixel transparency. For video decompression, the display processor 203 performs motion compensation and reconstruction. Because the media coprocessor can accelerate a range of video, 2D and 3D graphics, and audio processing, the media coprocessor 102 offers dramatic levels of cost/performance to applications. Furthermore, in order to maximize quality and performance with minimal memory, the media coprocessor 102 full color image type is 4:2:0 YUV (e.g., luma and subsampled chroma with 8 bits per component), for all 3-D graphics rendering as well as video and display. Thereby, this eliminates the need for any color conversions. The method for processing video and 3-D graphics in a single color space is also described in copending U.S. Patent Aapplication Serial Number (TBD) entitled "A Method And System For Performing Rasterization In Producing Three Dimensional Graphics Using YUV Color Space And Combining Same With Digital Video In YUV Color Space", filed concurrently herewith, and assigned to the assignee of the present invention and which is hereby incorporated by reference in its entirety. Various texture image types with fewer bits per pixel than full color are also supported. Whereas traditional 3-D graphics uses 8 bit red, green, and blue channels per pixel, YUV offers compelling advantages when the display device is a consumer television instead of a computer monitor.

Figure 3:
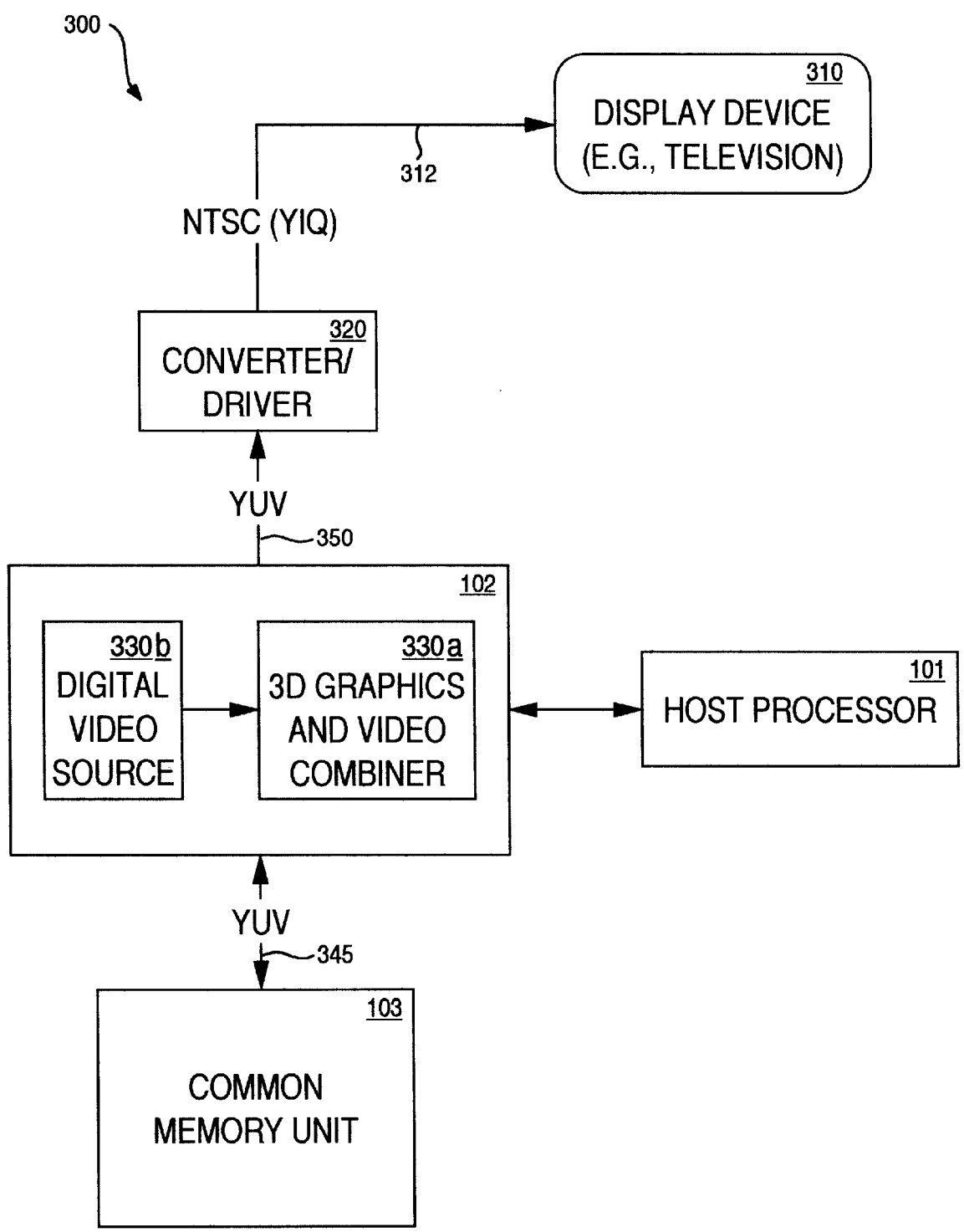
FIG. 3 shows an embodiment of the present invention used as a display system.

With reference to FIG. 3, an embodiment of the present invention used as a display system 300 is illustrated. One embodiment of the present invention includes a media coprocessor circuit 102 for generating signals 350 that are used to drive a display screen 310. Signals on line 350 are a digital pixel stream with video timing to an external video encoder (RF modulator circuit) 320. In one embodiment, the display screen 310 is a television set, however, it is appreciated that the present invention is equally well suited to provide signals for driving displays of other cathode ray tube (CRT) technologies, computer monitors, or flat panel display screens (field emission, liquid crystal display, etc.). In this embodiment, the television set provides up to 720×480 resolution for high quality NTSC (720×576 for PAL). The display buffer, described below, is doubled buffered so that various video and 3-D graphics functions can create a composite image without visible artifacts.

The media coprocessor circuit 102 of the present invention advantageously includes a digital video producing subsystem 330b integrated with a three dimensional 3-D graphics subsystem 330a, both systems processing image data in YUV color coordinates (e.g., according to the CCIR-601 color standard). These circuits are described in more detail in FIG. 4 below. The digital video producing subsystem 230b processes image data using YUV color coordinates. The digital video subsystem 230b produces digital video signals in accordance with the Motion Pictures Expert Group (MPEG II) information transmission standard.

The digital video subsystem 230b and the three dimensional graphics subsystem 230a of FIG. 3 are both coupled to a common (e.g., single) memory unit 103 for storage and retrieval of image information encoded in YUV color coordinates thereby obviating the need for a duplicate memory system as required of the prior art. The digital video subsystem 330b and the three dimensional graphics subsystem 330a are implemented on a single integrated circuit chip. The common memory unit 103 can also be integrated into the above circuit chip in one embodiment.

The three dimensional graphics system 330a advantageously generates digital image information using YUV color encoded coordinates (e.g., using Y, Cr, Cb coordinates). That is, all color representations, manipulations, stores, transfers, etc., with respect to image information (e.g., graphic primitive rasterization, texture mapping, filtering, anti-aliasing, deflicker filtering, etc.) exist and are performed by the three dimensional graphics subsystem 330a using Y, Cr and Cb color coordinate values. Therefore, the three dimensional graphics subsystem 330a stores and accesses image information from the common memory unit 103 using Y, Cr and Cb color coordinates. Unlike the prior art, RGB color coordinates are not used by the three dimensional graphics subsystem 330a in accordance with the present invention. Within the present invention, the YUV and YCrCb color encoding formats are used interchangeably and among these two color formats, one format could be replaced with the other without departing from the spirit and scope of the present invention.

The digital video producing subsystem 330b, in accordance with the present invention, produces digital video information using YUV color coordinates. Although a particular embodiment of the digital video subsystem 330b is illustrated below, the digital video subsystem 330b can be implemented using any of a number of well known digital video producing components, such as a bit stream from a digital CDROM, a video camera, a video tuner, any of a number of compact disk players, a digital video disk (DVD), a video hard drive, or any of a number of MPEG II compatible bit stream producers. Video sources range in resolution from 320×240 up to 720×480 and can be displayed from full screen to icon-sized or zoomed. As is well known in the art of the digital video, the digital video subsystem 330b produces digital video using the YUV color encoded format. That is, color information is represented, manipulated, stored and supplied in Y, Cr, Cb color coordinates within the digital video subsystem 330b. Therefore, the digital video subsystem 330b also stores and accesses image information from the common memory unit 103 using Y, Cr and Cb color coordinates.

Although a number of different digital video implementations can be used for subsystem 330b, each typically performs the following steps in producing a digital video stream. First a video decompression (e.g., MPEG) is performed followed by a video decode and digitization. Scaling (e.g., resize, zoom) is performed, then filtering (e.g., noise reduction) is done. Keying (e.g., alpha from chroma or luma) is done followed by a copy step (e.g., pan, scroll, wipe) followed by a blending step (e.g., fade, dissolve, matte). The digital video is then ready for display.

The display system 300 of FIG. 3 includes a common memory unit 103 ("frame buffer") which is coupled to media coprocessor circuit 102 and in one embodiment can also be integrated within media coprocessor circuit 102. In another embodiment, common memory unit 103 is implemented with a single array of commercially available DRAMs and provides at least 250 Mbytes per second peak bandwidth in configurations of 4 Mbytes on up. Common memory unit 103 is used for system memory, application memory, display buffer memory, intermediary MPEG frames and input/output buffering. Common memory unit 103 receives image information in Y, Cr, Cb encoded color coordinates from the digital video subsystem 330b and also from the three dimensional graphics subsystem 330a. Common memory unit 103 also supplies image information in Y, Cr, Cb encoded color coordinates to the digital video subsystem 330b and also to the three dimensional graphics subsystem 330a.

By using a common memory unit to receive image information from both the digital video subsystem 330b and also from the three dimensional graphics unit 330a, the present invention advantageously avoids the need to provide duplicate memory units for subsystem 330a and for subsystem 330b, as required of the prior art display systems. This is accomplished by the present invention, in part, by providing a three dimensional graphics subsystem 330b that performs all color representations and manipulations in Y, Cr, Cb color coordinates.

As shown by FIG. 3, YUV color encoded image information is stored into and accessed from the common memory unit 103 over bidirectional bus 345. Further, media coprocessor circuit 102 is capable of providing color coded digital image information over bus 350 to a converter/driver circuit 320. The converter/driver circuit 320 transforms the digital image information to an analog signal 312 that is used to drive the display screen 310. A number of well known technologies can be used to implement circuit 320. In one embodiment, the NTSC signal 312 is used to drive a television monitor 310.

It is appreciated that a number of well known mixing techniques can be added to media coprocessor circuit 102 to allow the mixing of YUV color encoded image data from the digital video signal subsystem 330b and from the three dimensional graphic subsystem 330a. In one such mixing technique, the three dimensional graphics subsystem 330b includes circuitry for combining digital video information with 3-D graphics data. Applications running on media coprocessor circuit 102 can combine several different image sources into a single display. An exemplary display might consist of 3-D graphics generated icons above decompressed video actors moving around a synthetic 3-D graphics environment with a digitized video background. In one embodiment, media coprocessor circuit 102 provides sufficient composite resources such that a single display buffer image can be assembled from the various image sources under software control. In this embodiment, the entire composite image may need to be redrawn for each screen update, but less memory, display bandwidth, and hardware is needed using this approach.

Display system 300 can also include a host processor 101 coupled to the media coprocessor 102. In one embodiment, a commercially available MIPS4 64 bit processor is used as the host processor 101. The host processor 101 provides a portable high performance applications platform with a complete high level language development environment.

Figure 4:
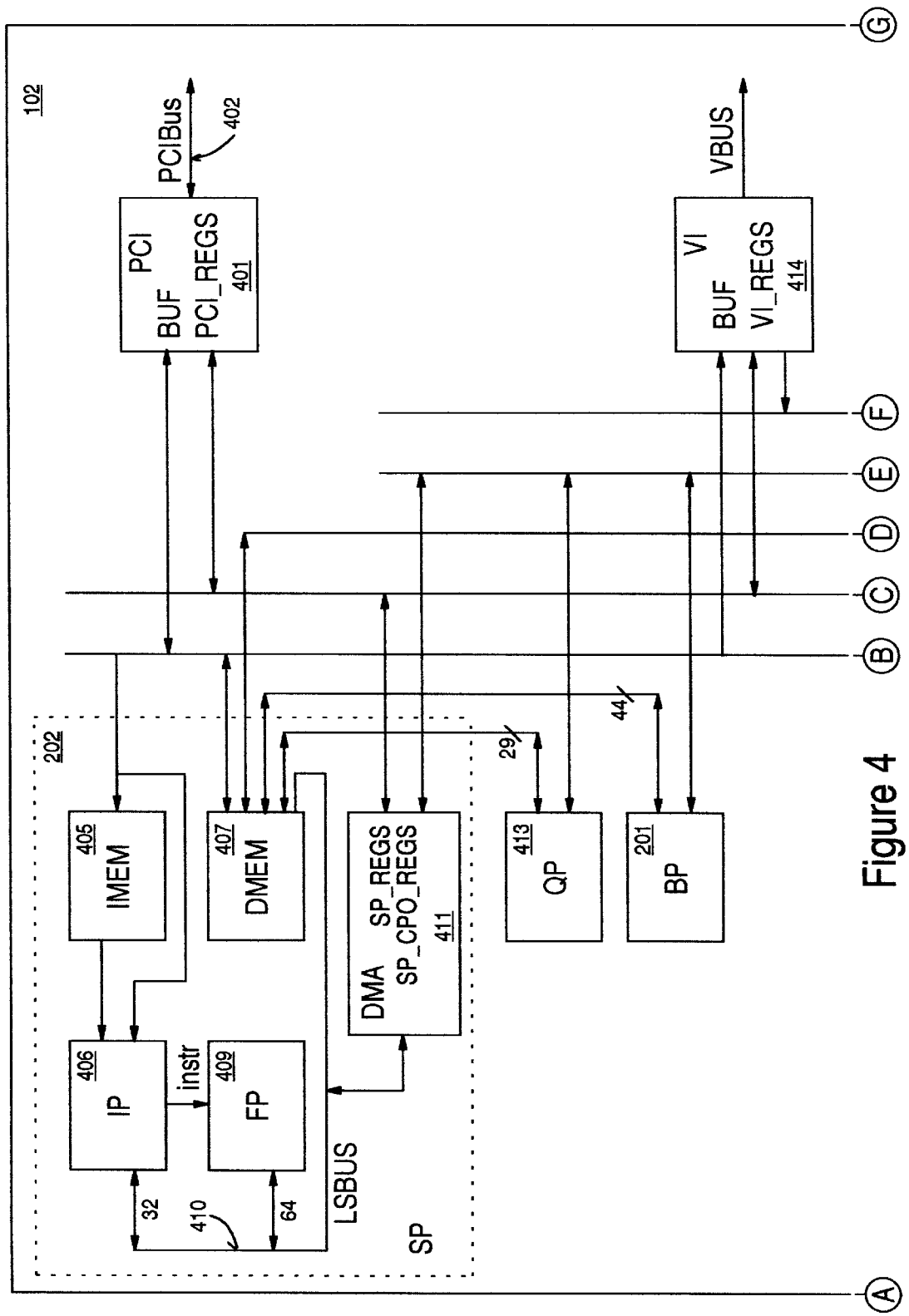
FIG. 4 illustrates the circuitry of the media coprocessor of the present invention.
Figure 4:
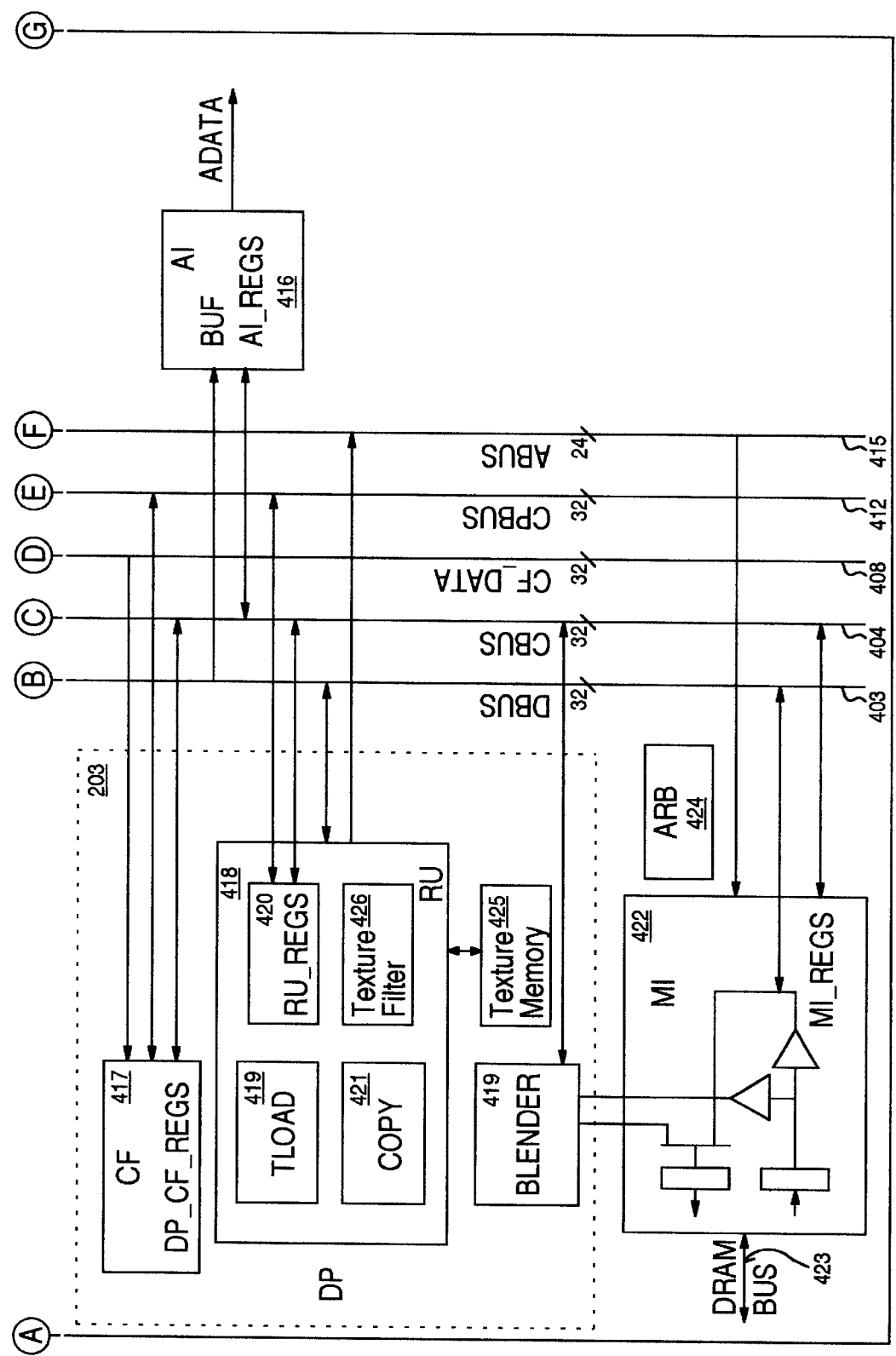

FIG. 4 illustrates the circuitry of the media coprocessor 102 of the present invention in more detail. The media coprocessor 102 includes a digital signal processor 202, a bit stream processor 201 and a display processor 203. Media coprocessor 102 of FIG. 4 includes a host bus interface 401 (e.g., a Peripheral Component Interface) for communicating with a host bus 402 of the host processor. Data 403 and control 404 busses are connected to the host bus interface 401. Media coprocessor 102 also contains an instruction memory 405 coupled to the 32-bit data bus 403 and an instruction processor 406 coupled to the instruction memory 405 and to bus 403. A data memory unit 407 is also coupled to bus 403 and to bus 408. Graphics primitives are stored in the data memory unit 407. The instruction processor 406 is also coupled to a floating point processor 409 via bus 410. Floating point processor 409 is used to perform a wide variety of functions. It is used to perform geometry calculations for 3-D graphics; audio functions; and MPEG2 video operations. Thus, the same floating point processor 409 is used in 3-D graphics, audio, and video calculations.

Bus 410 is also coupled to a direct memory access (DMA) unit 411 which is itself coupled to bus 404 and also to bus 412. The instruction processor 406, the instruction memory 320, the floating point unit 409, the data memory 407 and the DMA unit 411 constitute the digital signal processor 202. The digital signal processor 202, in one embodiment, is a microcoded single instruction multiple data (SIMD) processor with parallel integer multiplier accumulators. The digital signal processor 202 performs video and audio decompression and filtering, and geometry processing in conjunction with the host processor for 2D and 3D graphics operations. In one embodiment, the digital signal processor 202 supports 10 bit image coordinate range, 8 bit colors and 16 bit depth values.

The media coprocessor 102 of FIG. 4 also includes a quantization processor 413 (inverse discrete cosine transformation—DCT) and a bit stream processor 201, both of which are coupled to the data memory 407 and to bus 412. The bit stream processor 201 is a programmable integer processor optimized for decoding variable length code (VCL) digital bitstream data for MPEG. The bit stream processor 201 includes an instruction memory, a data memory and a registered integer data path. The bit stream processor 201 implements decoding through chained table lookups of 4-bit fields. This is enhanced for peak cases such as DCT coefficients by parsing a leading string of 1's or 0's into a table address in order to process up to 16-bit codes in one lookup operation. A video buffer circuit 414 is also coupled bus 403, bus 404 and to bus 415, and an audio buffer circuit 416 is coupled to bus 403 and to 404.

A display processor 203 is also incorporated into the media coprocessor 102 circuit of FIG. 4. Most of the functions of the three dimensional graphics subsystem 330a (FIG. 3) are performed by the display processor 203. The display processor 203 is a data driven display pipeline supporting both geometric 3-D graphics and image data types. For three dimensional graphics, the display processor 203 renders fully textured, shaded, antialiased, z-buffered, alpha-blended triangles. For video and two dimensional graphics, the display processor 203 scales, rotates, translated, filters, and composites images or sprites (primitives) with per pixel transparency. For the spatial domain portion of video decompression, the display processor 203 performs motion compensation and reconstruction. The display processor 203 displays both 3D textured polygons and images in the same display pipeline. Image display can be optimized with 2D texture coordinates without perspective correction, planar source data (without mipmap LOD trilerps), and YUv texture values for video. Sprites can be further optimized by reusing data in on-chip texture memory and point sampling.

The display processor 203 includes a color filter unit 417, a rasterization unit 418 and a blender unit 419. The color filter unit 417 is coupled to the color filter data bus 408, to bus 403 and also to control bus 404. A color blender unit 419 is also included within the display processor 455. The color blender unit 419 is coupled to bus 404. The rasterization unit 418 of the display processor 203 includes several units for processing 3-D graphics primitives in order to produce a set of pixels and colors (in Y, Cr, Cb space) associated therewith that represent the 3-D graphics primitives. To rasterize a 3-D graphics primitive entails converting the representation of the primitive to pixels. Specifically, the rasterization unit 418 performs subsampling of the color data associated with the pixels ("color subsampling") for a number of reasons. A first reason for color subsampling is that color subsampling reduces the amount of information required to represent the color of an image. A second reason for color subsampling is that, in one embodiment, the display device to be driven is a television set having relatively low color resolution and therefore the loss of color resolution attributed to color subsampling is not noticeable to the viewer. The rasterization unit 418 includes a texture load unit 419 (including within a texture memory unit), rasterization registers 420 and a copy buffer 421. Memory organization within the texture memory is tile based.

The texture memory buffers 425 of the display processor 203 all source image data used for texturing. Texture images are double word aligned and consist of scanlines of an even integer number of double words. Tiles within the texture memory support clamping of primitive texture coordinates to the minimum and maximum texture coordinates of the tile. Tiles can also enable the masking primitive texture coordinates to support wrapped textures if the tile size is a power of two and the texture image fits in the texture memory. Masking also supports mirroring by inverting the texture coordinate if the first masked bit is of a predetermined value (e.g., 1). Wrapped and mirrored textures that do not fit in the texture memory or whose sizes are not powers of two are implemented by primitive subdivision. Mipmapping is supported by loading the texture memory with a pyramid of images which represent filtered versions of the same texture image, typically at power of two scale factors (½, ¼, ⅛, etc.). Furthermore, the same texture memory 425 is used for 3-D graphics as well as motion compensation pertaining to MPEG. Thus, the texture memory 425 is shared between texture mapping and MPEG video processing. Another unit which is also shared is that of texture filter 426. Texture filter 426 is used to perform trilinear mip mapping (e.g., averaging a first pair of pixels; averaging a second pair of pixels; and averaging the two averages). Texture filter 426 is also used to perform motion compensation. There may be instances whereby the image is halfway between one frame and half way between another frame, in which case, the texture filter averages the two frames for display.

In one embodiment, the rasterization unit 418 also includes units for performing color combining (a color combiner unit), edge walking (an edge walker unit) and texture filtering (a texture filter unit). Also included is an MPEG motion compensation unit. The texture filter, for each display coordinate (x, y), gives an appropriate texel coordinate (u, v) and ratios for blending among texels. The color combiner unit produces a color for a pixel apart from the texel color. It is appreciated that within the present invention each of the above functions are performed on color coordinates represented and manipulated in the YUV color space.

The media coprocessor 102 of FIG. 4 also includes a memory interface block 422 for interfacing with a common memory unit over a DRAM bus 423. In one embodiment, the common memory unit is a synchronous dynamic random access memory (SDRAM). The memory interface block 422 includes one or more direct memory access (DMA) units. The memory interface 422 optimizes DRAM block transfers for the host processor, audio, video and input/output ports. An arbitration unit 424 is used to arbitrate transmissions over the various busses.

Figure 5:
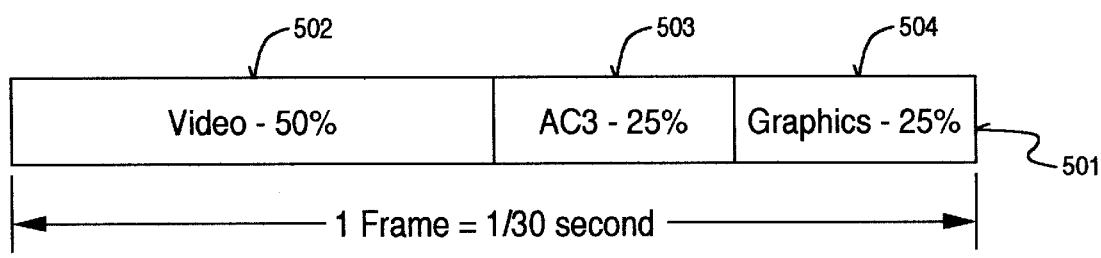
FIG. 5 shows a timing diagram of the partitioning.

FIG. 5 shows a timing diagram of the partitioning. The partitioning is synchronized to a video frame 501. Video frame 501 lasts one-thirtieth of a second. Other timing synchronization schemes can also be used (e.g., 60 hertz or one-sixtieth of a second). Each time frame 501 is partitioned into three parts. The first partition 502 is used to perform video functions; the second partition 503 is used to perform audio functions; and the third partition 504 is used to perform 3-D graphics functions. The times for performing each of the video, audio, and 3-D graphics functions are variable. For example, there may be instances whereby there is no video applications running or where there is a minimal amount of video signals which need to be processed. In this case, the time allocated to the video partition is reduced. In other instances, video processing may dominate, in which case, the video partition is increased. Likewise, the audio partition can be reduced or increased to suit the current needs. Whatever time that is left over in the frame, is used to perform 3-D graphics/synthesis. In a worst case scenario, the video partition 502 is allotted 50% of the frame; the audio (e.g., AC3, ATSC standard for U.S. HDTV) partition 503 is allotted 25% of the frame; and the 3-D graphics partition 504 is allotted the remaining 25% of the frame. The media co-processor performs each of the three tasks sequentially and within each of their respective partitions. The process of dividing a pre-determined amount of time into separate time slices or partitions and performing a different task in each of the partitions is known as time-division multiplexing (TDM). In the time-division multiplexing scheme of the present invention, a time equivalent to a video frame is divided into three separate partitions, whereby each task is allowed a certain amount of time to perform its functions. The partitioning sequence is then repeated.

Although the media co-processor performs several different functions during each update period, such as decompressing and filter audio, decompressing and compositing video and rendering 3-D graphics, these functions do not occur simultaneously. Instead, each function is completed independently in a time slice within the update period. Because the overhead of swapping instructions and data in and out of the various processing elements is relatively high, the present invention performs all the processing for a particular function for an update at once, rather than switching between small amounts of audio, video, and 3-D graphics processing.

Figure 6:
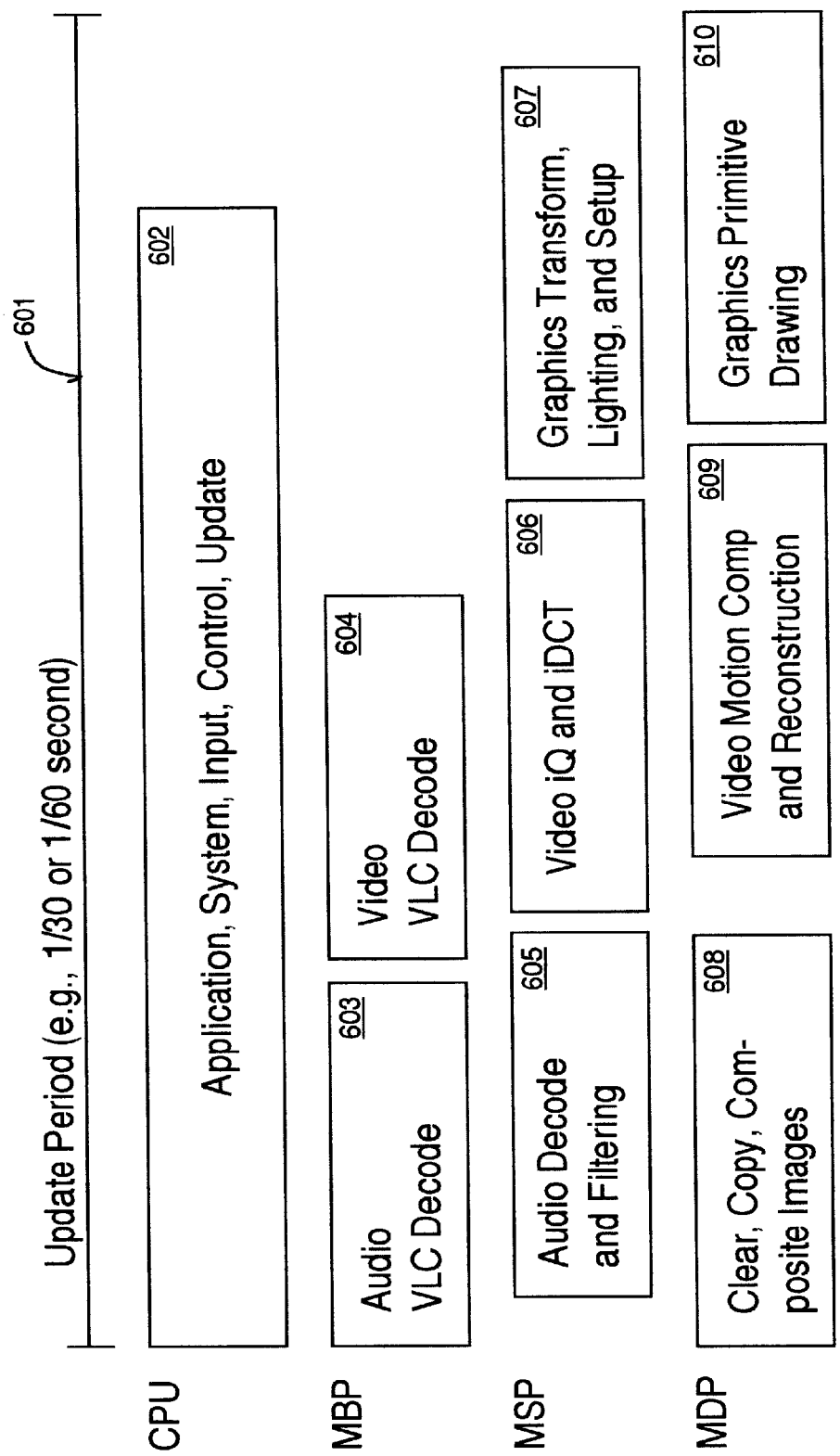
FIG. 6 illustrates an exemplary time-division multiplexing scheme.

An example of time-division multiplexing is illustrated in FIG. 6. Within an update period (e.g., 1/30 or 1/60 second), the CPU performs application, system, input, control, and update functions 602. The MBP decodes audio and video VLC's 603 and 604. The MSP performs audio decode and filtering 605; video iQ and iDCT 606; and 3-D graphics transform, lighting, and setup 607. The MDP performs clear, copy, and composite images 608; video motion compensation and reconstruction 609; and 3-D graphics primitive drawing 610. More specifically, at the vertical interval, the CPU software switches display buffers and performs an audio direct memory access (DMA) output to the next set of audio buffers. Afterwards, the CPU commands the MDP to begin initializing the next display buffer by clearing the color and depth images, copying background images, or compositing video images. Meanwhile, the MBP decodes audio digital bitstream packets and passes the packets to the MSP to perform audio decompression and filtering on the data. When the audio and display processing for the next update is complete, the CPU directs the MBP to decode video digital bitstream packets and passes them to the MSP for inverse quantization and discrete cosine transforms, while the MDP performs motion compensation and reconstruction with the MSP output. When video processing for the next update is complete, the CPU commands the MSP to transform and setup the 3-D graphics data for the next update. Thereupon the MSP commands the MDP to draw the 3-D graphics primitives it had processed. Meanwhile, the CPU reads input devices and script information and prepares of the next update and then waits for the next vertical interval. It should be noted that the update period should be balanced with the amount of processing to be performed within it in order to sustain a particular update rate. If the processing has not yet completed by the appropriate next vertical interval, the CPU software decides whether to delay the buffer switch and complete the update processing or to terminate processing, switch buffers, and proceed to process the next update. Audio processing must continue to generate audio buffers at the output sample rate.

Figure 7:
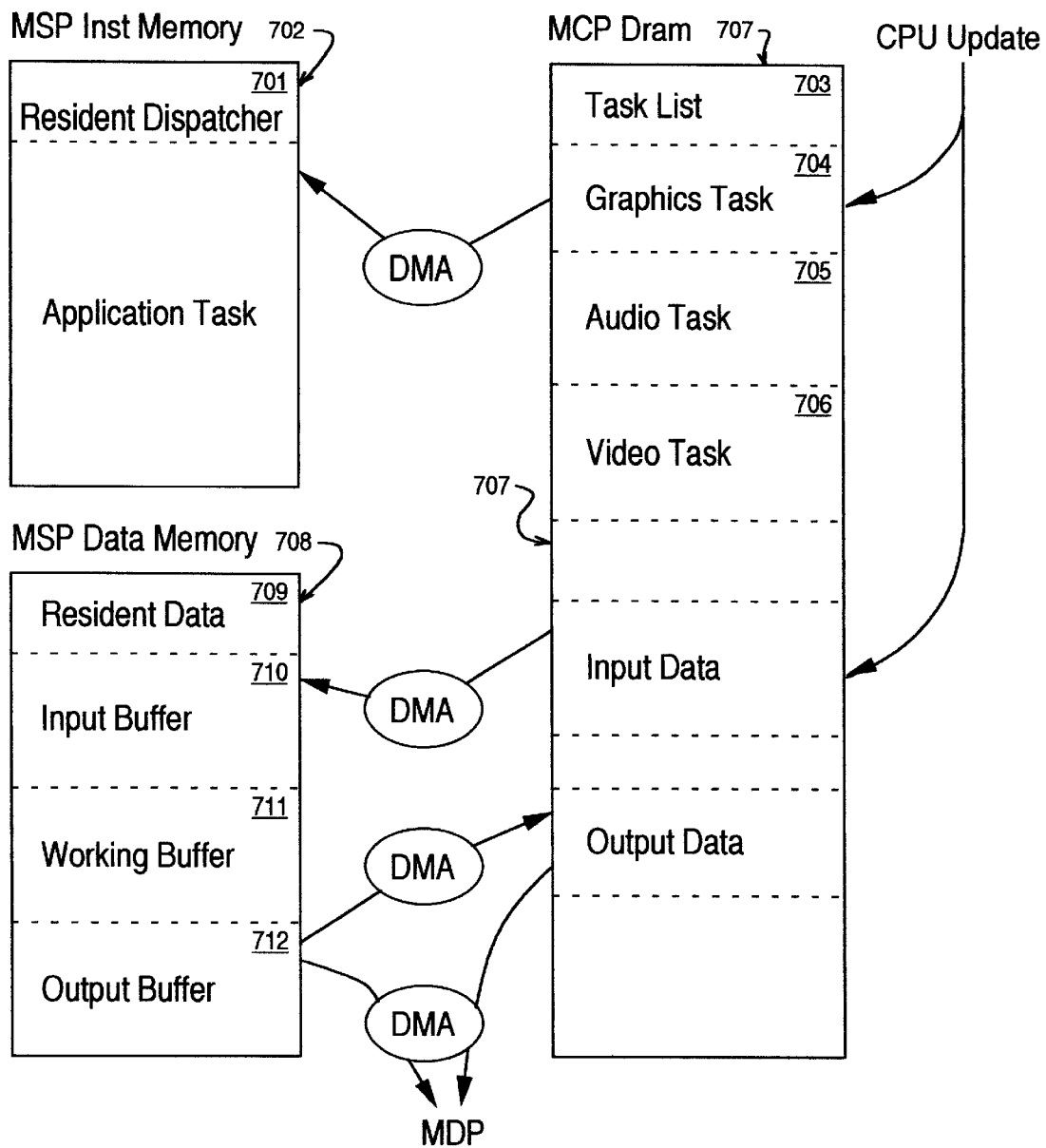
FIG. 7 shows a data structure for performing the partitioning scheme of the present invention.

FIG. 7 shows a data structure for performing the partitioning scheme of the present invention. Because the MSP is a physical address, single context processor with on-chip data and instruction RAMs, software is designed to efficiently use MSP resources for the several functions which are performed in each update period. A small amount of resident dispatcher code 701 in the MSP Instruction Memory (Imem) 702 reads code for the next function to be performed from a task list 703 updated by the CPU. The task list contains code and data addresses and lengths. The MSP then initiates a DMA transfer of the task code into Imem 702 and then jumps to the starting address within the task (e.g., 3-D graphics task 704, audio task 705, video task 706, etc.). The task initiates DMA transfers of input data buffers from DRAM 707 to Data Memory (Dmem) 708, where it process the data and generates output buffers for DMA back into DRAM 707. MSP Dmem 808 contains a resident data portion 709, input buffer 710, working buffer 711, and output buffer 712. The MDP command interface may DMA directly from MSP Dmem or from DRAM. When complete, the task returns to the dispatcher code. Tasks are constructed to fit entirely into Imem in order to minimize code swapping. Tasks organize data access so that the DMA of the input and output buffers in Dmem occur in parallel with processing data in the MSP.

Figure 8:
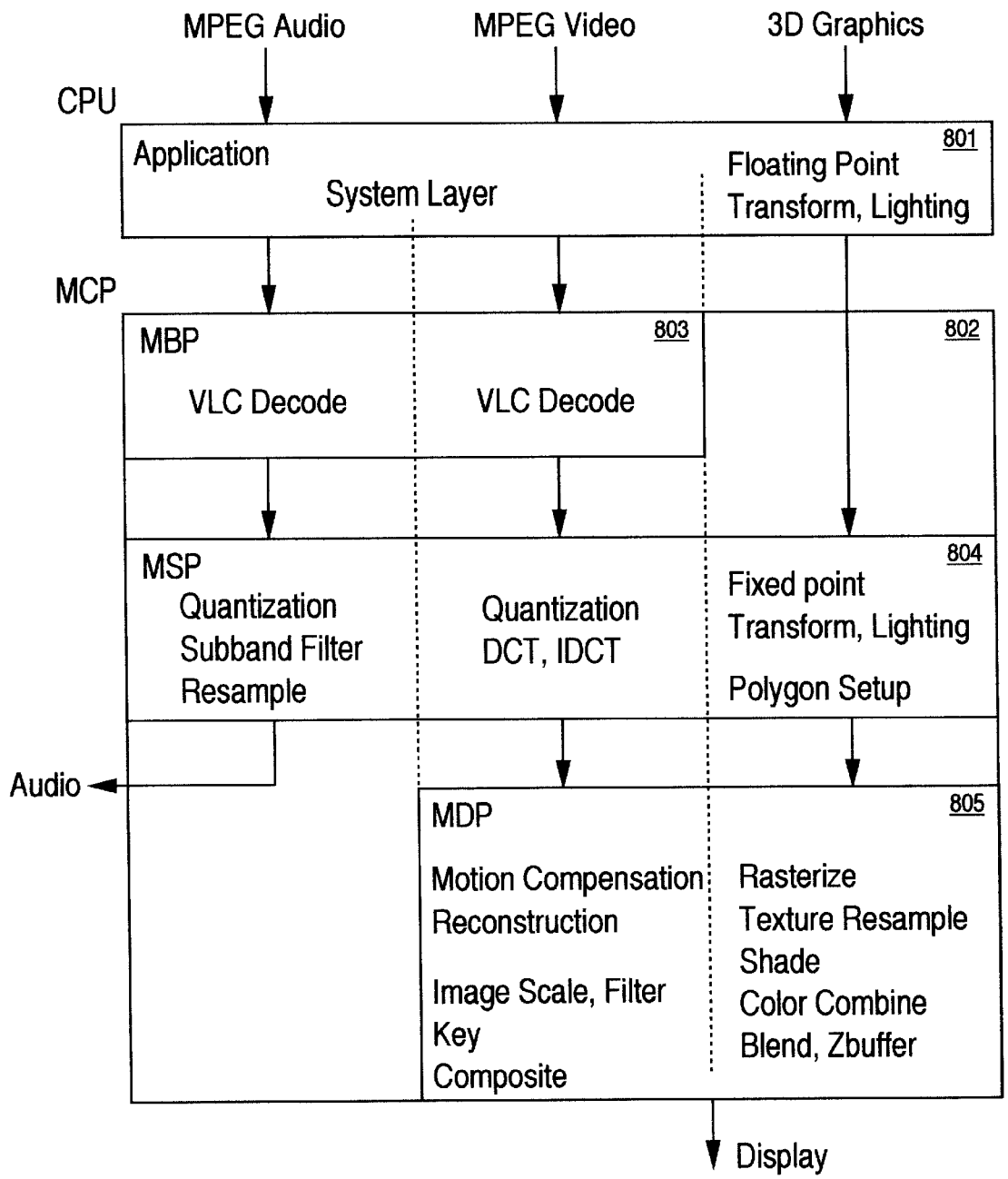
FIG. 8 shows a block diagram for the currently preferred embodiment for applications partitioning.

FIG. 8 shows a block diagram for the currently preferred embodiment for applications partitioning. MPEG audio, MPEG video, and 3D graphics data are input to the CPU 801. Since the media coprocessor is designed to be a very low cost system, all hardware resources contribute to applications functionality. Consequently, the CPU 801, in addition to the application and operating system, executes the system layer of MPEG as well as performs floating point geometry, transformations, and lighting effects for 3-D graphics. As described above, the media coprocessor 802 has three processors. The media digital bitstream processor (MBP) 803 performs digital bitstream decoding, such as VLC decoding for MPEG audio and MPEG video. The media digital signal processor (MSP) 804 is programmed to perform the signal processing portion of video and audio compression/decompression and to perform fixed point geometry processing for 3-D graphics. The integer vector computation of the MSP has enough precision for limited precision for 3-D graphics applications (e.g., a 10-bit image coordinate range, 8-bit colors, and 16-bit depth values). MSP 804 performs quantization, subband filter, and resample functions for MPEG audio; quantization, discrete cosine transformation (DCT) and inverse discrete cosine transformation (IDCT) for MPEG video; and polygon setup for 3-D graphics.

The media display processor (MDP) 805 displays both 3D textured polygons and images in the same display pipeline.

The image display can be optimized with 2D texture coordinates without perspective correction, planar source data (without mipmap level-of-detail trilinear interpolations), and YUV texture values for video. Furthermore, sprites can be optimized by reusing data in on-chip texture memory and point sampling. The MDP also performs the spatial domain portion of video decompression, such as motion compensation and reconstruction. In addition, MDP 805 performs image scaling, filtering, keying, and compositing functions for MPEG video. For 3D graphics, MDP 805 performs rasterization, texture resampling, shading, color combination, blending, and Z buffering functions. Because the MDP is limited to display precision, it can be implemented with 8-bit multipliers, whereas the more general audio and video processing applications of the MSP require 16bit multipliers. While the media coprocessor performs many application functions, at any particular time, the entire media coprocessor is performing one function, such as MPEG or 3-D graphics. Over a given time interval (e.g., a frame time), the media coprocessor switches between the various functions, but at a coarse granularity, such as generating a frame of 3-D graphics or a frame of MPEG video.

Figure 9:
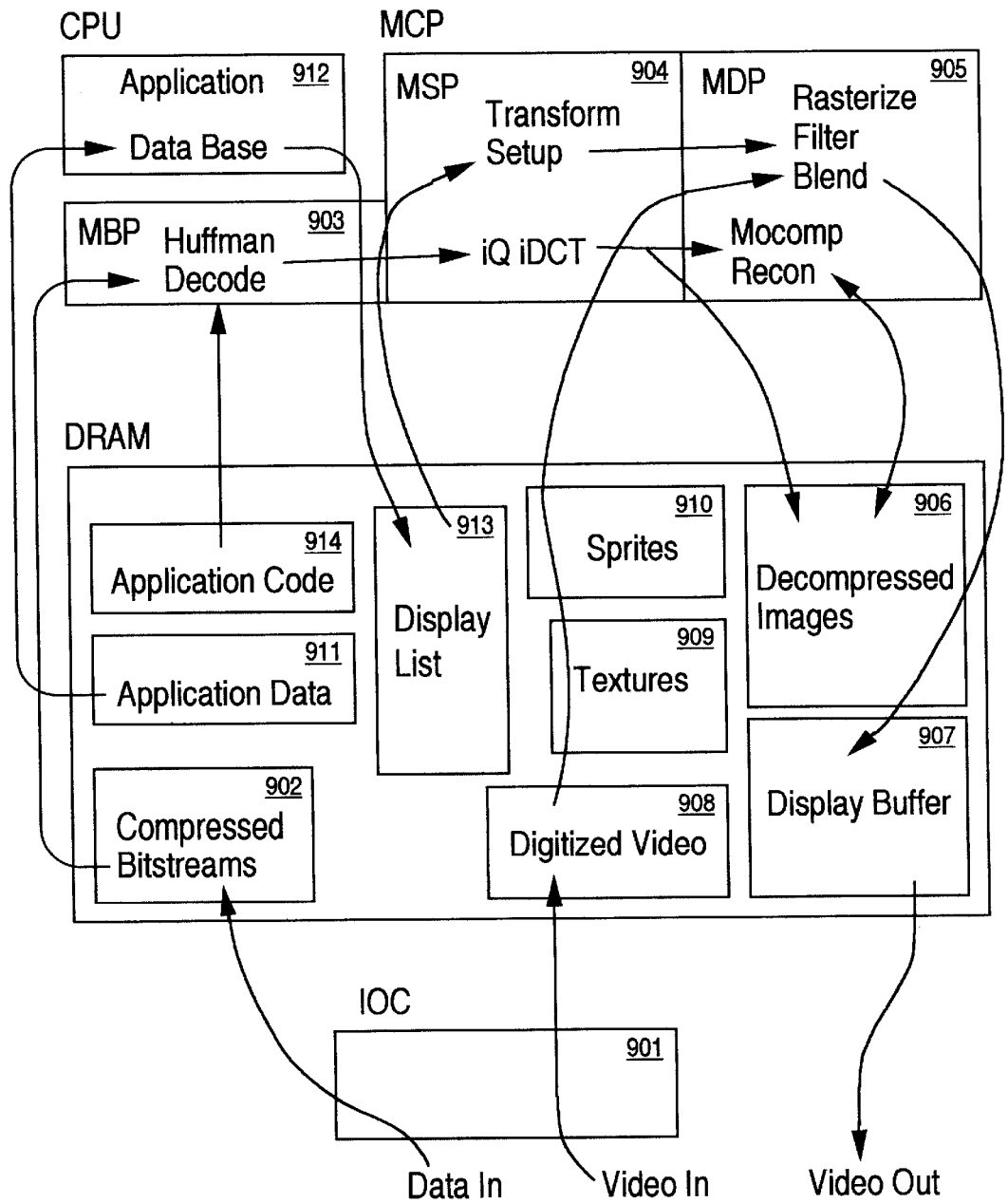
FIG. 9 shows an applications data flow diagram.

FIG. 9 shows an applications data flow diagram. The MCP supports a single memory array for all applications code, data, display buffers, etc. Typical data flow for audio, video, and 3-D graphics is shown in FIG. 9. Data input to the IOC 901 is compressed by 902 and sent to the MBP 903 for Huffman decoding. An iQ and iDCT is performed by the MSP 904. Motion compensation and reconstruction is performed in the MDP 905. Decompressed images are stored in the DRAM block 906 before being rendered out to the display buffer 907 for video out. Video in is handled by IOC 901. The digitized video, textures, sprites, and primitives stored in blocks 908–910 of the DRAM are fed into the MSP 904 for rasterization, filtering, and blending by the MDP 905 before being stored into the display buffer 907. Application data 911 is processed by the application and data base 912 of the CPU according to the display list 913. A transform/setup is then performed by the MSP 904 the flow proceeds to the MDP 905. Application code 914 aids in the Huffman decoding of MBP 903. Audio is similar but without a pass through the MDP 905.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A single semiconductor chip for performing audio, video, and 3-D graphics functions comprising:

a digital bitstream processor for decoding variable length code digital bitstream data;

a digital signal processor coupled to the digital bitstream processor which performs video and audio decompressing, filtering, geometry processing, and performing wavetable synthesis for audio;

a display processor coupled to the digital signal processor which supports both geometric 3-D graphics and image data types, wherein an update interval sychronized to a video frame is defined, the update interval is divided into a plurality of partitions such that audio data is processed during a first partition, video data is processed during a second partition, and graphics data is processed during a third partition, the processing being performed in a sequential, time-division multiplex scheme whereby the single semiconductor chip processes all three partitions in a single video frame;

a memory controller coupled to an external memory array, said memory array used to store image data and instruction data;

an audio/video input/output port coupled to the display processor.

2. The single semiconductor chip of claim 1, wherein the display processor renders textured, shaded, antialiased, Z-buffered, alpha blended polygons.

3. The single semiconductor chip of claim 2, wherein the display processor performs motion compensation and reconstruction for video.

4. The single semiconductor chip of claim 3, wherein the display processor scales, rotates, translates, filters, and composites primitives with per-pixel transparency.

5. The single semiconductor chip of claim 1, wherein the digital signal processor includes a floating point unit coupled to the interface which calculates 3-D graphics, video and audio operations.

6. The single semiconductor chip of claim 1 further comprising an internal memory coupled to the floating point unit for storing texture data and video data.

7. The single semiconductor chip of claim 1, wherein the digital signal processor includes a filter coupled to the internal memory for use in performing both mip-mapping and motion compensation.

8. A system for performing 3-D graphics, video, and audio functions, comprising:

a central processing unit for processing data;

a memory array coupled to the central processing unit for storing instructions data and image data pertaining to 3-D graphics and video;

a media coprocessor wherein an update interval sychronized to a video frame is defined, the update interval is divided into a plurality of partitions such that audio data is processed during a first partition, video data is processed during a second partition, and graphics data is processed during a third partition, the processing being performed in a sequential, time-division multiplex scheme whereby the media coprocessor processes all three partitions in a single video frame;

an input/output controller coupled to the media coprocessor for accepting commands and outputting audio, video, and 3-D graphics data.

9. The system of claim 8, wherein the media coprocessor includes:

a digital bitstream processor for decoding variable length code digital bitstream data;

a digital signal processor coupled to the digital bitstream processor which performs video and audio decompressing, filtering, and geometry processing;

a display processor coupled to the digital signal processor which supports both geometric 3-D graphics and image data types;

a memory controller coupled to an external memory array, said memory array used to store image data and instruction data;

an audio/video input/output port coupled to the display processor.

10. The single semiconductor chip of claim 9, wherein the display processor renders textured, shaded, antialiased, Z-buffered, alpha blended polygons; performs motion compensation and reconstruction for video; scales, rotates, translates, filters, and composites primitives with per-pixel transparency; operates in a full color image type for all 3-D graphics rendering as well as video and display.

11. The single semiconductor chip of claim 9, wherein the digital signal processor includes a filter coupled to the internal memory for use in performing both mip-mapping and motion compensation.

12. A method for performing audio, video, and 3-D graphics functions comprising the steps of:

defining an update time;

partitioning the update time into a plurality of partitions;

processing audio data in a first partition;

processing video data in a second partition;

processing 3-D graphics data in a third partition, wherein an update interval sychronized to a video frame is defined, the update interval is divided into a plurality of partitions such that audio data is processed during a first partition, video data is processed during a second partition, and graphics data is processed during a third partition, the processing being performed in a sequential, time-division multiplex scheme wherein all three partitions in a single video frame;

outputting an audio signal;

displaying the video and 3D graphics onto a display screen.

13. The method for performing audio, video, and 3-D graphics functions of claim 12, wherein the steps of the method are performed by a single semiconductor chip.

14. The method for performing audio, video, and 3-D graphics functions of claim 12, wherein the update time is a frame time.

15. The method for performing audio, video, and 3-D graphics functions of claim 14, wherein the first partition is approximately twenty-five percent of the frame time, the second partition is approximately fifty percent of the frame time, and the third partition is approximately twenty-five percent of the frame time.

16. The method for performing audio, video, and 3-D graphics functions of claim 12, wherein the processing steps are performed sequentially in series.

17. The method for performing audio, video, and 3-D graphics functions of claim 12 further comprising the step of storing a task list in memory and storing a 3-D graphics task, an audio task, and a video task in the memory.

18. The method for performing audio, video, and 3-D graphics functions of claim 17 further comprising the step of storing an application task and a resident dispatcher in an instruction memory and resident data in a data memory.

19. The method for performing audio, video, and 3-D graphics functions of claim 12 further comprising the steps of:

performing decoding, quantization, filtering, and resampling on the audio data in the first partition;

performing decoding, quantization, discrete cosine transformation, motion compensation, reconstruction, image scaling, filtering, and compositing on the video data in the second partition;

performing lighting, polygon setup, rasterization, texturing, shading, color combination, blending, and depth comparisons on the 3-D graphics data in the third partition.

* * * * *